United States Patent
Hijikata et al.

(10) Patent No.: US 12,157,993 B2
(45) Date of Patent: Dec. 3, 2024

(54) SANITARY EQUIPMENT PART

(71) Applicant: TOTO LTD., Kitakyushu (JP)

(72) Inventors: Ryojiro Hijikata, Kitakyushu (JP); Saori Ukigai, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 17/280,659

(22) PCT Filed: Mar. 1, 2021

(86) PCT No.: PCT/JP2021/007681
§ 371 (c)(1),
(2) Date: Mar. 26, 2021

(87) PCT Pub. No.: WO2021/199832
PCT Pub. Date: Oct. 7, 2021

(65) Prior Publication Data
US 2023/0025955 A1 Jan. 26, 2023

(30) Foreign Application Priority Data
Mar. 31, 2020 (JP) ................................. 2020-064493

(51) Int. Cl.
*E03C 1/04* (2006.01)
*B32B 9/04* (2006.01)
*B32B 15/04* (2006.01)

(52) U.S. Cl.
CPC ............ *E03C 1/0404* (2013.01); *B32B 9/041* (2013.01); *B32B 15/04* (2013.01);
(Continued)

(58) Field of Classification Search
CPC ...... E03C 1/0404; E03C 1/04; E03C 2201/70; B32B 9/041; B32B 15/04; B32B 2255/06;
(Continued)

(56) References Cited

U.S. PATENT DOCUMENTS

| | | | |
|---|---|---|---|
| 2011/0311769 A1* | 12/2011 | Chen | C09D 5/1668 428/688 |
| 2015/0239023 A1 | 8/2015 | Iwata et al. | |
| 2019/0210271 A1* | 7/2019 | Sekhar | B29C 59/14 |

FOREIGN PATENT DOCUMENTS

| | | |
|---|---|---|
| JP | 2000-265526 A | 9/2000 |
| JP | 2004-217950 A | 8/2004 |

(Continued)

OTHER PUBLICATIONS

PCT/IB/373 and PCT/ISA/237 from International Application PCT/2021/007681, of which the present application is a national phase of PCT/JP2021/007681.

*Primary Examiner* — Nathan L Van Sell
(74) *Attorney, Agent, or Firm* — Carrier, Shende & Associates P.C.; Joseph P. Carrier; Jeffrey T. Gedeon

(57) ABSTRACT

A part includes a base material and a surface layer on the base material, wherein a curved surface of the part has: a root mean square height (Sq) of 0.03 μm to 1 μm, a skewness (Ssk) of −1 to 5, and an autocorrelation length (Sal) of 10 μm to 65 μm; and the surface layer is water-repellent, and exhibits a sputtering time of 5 minutes or less, the sputtering time being a time taken from the start of the sputtering to an end point of the surface layer, and the end point being defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less.

26 Claims, 2 Drawing Sheets

(52) U.S. Cl.
CPC ....... *B32B 2255/06* (2013.01); *B32B 2255/20* (2013.01); *B32B 2255/205* (2013.01); *B32B 2255/28* (2013.01); *B32B 2307/402* (2013.01)

(58) Field of Classification Search
CPC .......... B32B 2255/20; B32B 2255/205; B32B 2255/28; B32B 2307/402; C23C 28/00; C23C 14/24; C23C 14/04; C23C 14/0635; C23C 14/0641; C23C 14/0664; C23C 14/16; C23C 14/18; C23C 14/20; C09K 3/18

See application file for complete search history.

(56) References Cited

FOREIGN PATENT DOCUMENTS

| | | |
|---|---|---|
| JP | 2008-163362 A | 7/2008 |
| JP | 2012-240395 A | 12/2012 |
| JP | 2015-193911 A | 11/2015 |
| JP | 2018-165394 A | 10/2018 |
| JP | 2019-137594 A | 8/2019 |

\* cited by examiner

SANITARY EQUIPMENT PART

TECHNICAL FIELD

The present invention relates to a sanitary equipment part including a water-repellent layer on a surface thereof, and particularly to a sanitary equipment part used in an environment exposed to water.

BACKGROUND ART

Water for domestic use including tap water contains silicon and calcium which cause the formation of scales. In a wet area part that may contact with water for domestic use, it has been required that the adhesion of scales be suppressed or scales once adhered can be easily removed. In one of the known techniques for preventing the adhesion of stains such as scales to the surface of the wet area part or improving the stain removability, the surface of the wet area part is covered with a protective layer to modify the surface of the part, for example.

However, providing the protective layer on the wet area part adds color or a damage or separation of the protective layer impairs the appearance of the part, which is a problem. On the other hand, it is difficult to prevent the stains from adhering to the surface of the wet area part; therefore, the stains are usually removed by cleaning. To remove the tough stains such as scales, for example, polishing is performed using a special detergent. This method is a big burden in everyday life. In view of this, it has been desired to remove the stains by simple cleaning.

In a known antifouling technique, a monolayer that is chemically bonded directly to a base material is used as the protective layer. For example, JP 2004-217950 A (PTL 1) discloses that covering a surface of a faucet fitting with fluorine alkylphosphonic acid can obtain scale removability. The monolayer is a thin layer that is not visually recognizable. By providing the monolayer, the function of the monolayer can be imparted to the part with less probability of impairing the appearance of the part. Furthermore, by bonding the monolayer with phosphoric acid, the monolayer can be formed densely. Accordingly, most part of hydroxy groups on the surface of the base material can be shielded, so that the adhesion of stains on the surface of the base material can be prevented and the stains can be removed easily. JP 2000-265526 A (PTL 2) discloses that the adhesion of silicic acid scale stains is suppressed by providing an antifouling layer that shields hydroxy groups on the surface of pottery. It also discloses that this antifouling layer is an antifouling layer coated with and dried a mixture of the hydroxy groups on the surface of pottery, an organic silicon compound containing an alkyl fluoride group, a methylpolysiloxane compound containing a hydrolyzable group, and an organopolysiloxane compound.

On the other hand, regarding the surface texture of the sanitary equipment part, JP 2018-165394 A (PTL 3) discloses that oil stains can be wiped off more easily by smoothing a stainless surface (arithmetic average roughness Ra of 0.05 µm or less, maximum profile valley depth Pv of 2.0 µm or less). US 2015/0239023 A (PTL 4) discloses that by providing on a material surface a surface antifouling layer having a minute concave and convex structure with a surface roughness Sa of 1 nm or more to 1 mm or less, a fingerprint is diffused due to a capillary action and the visibility is decreased.

CITATION LIST

Patent Literatures

[PTL 1] JP 2004-217950 A
[PTL 2] JP 2000-265526 A
[PTL 3] JP 2018-165394 A
[PTL 4] US 2015/0239023 A

SUMMARY OF INVENTION

Technical Problem

As a product is used every day, stains such as scales adhere and dry repeatedly, and thus deposit on the product. Consequently, there have been problems that stains need to be wiped off with larger force or more frequently. In particular, in an area not within the reach of a hand in everyday cleaning, for example on a surface facing down or a back surface of a faucet fitting, stains easily deposit, and even if a surface layer (for example, monolayer) is formed on the area, the stains are hard to be removed.

The present inventors have found that by providing a water-repellent surface layer with a concave and convex structure of micrometers order on a surface of a sanitary equipment part, the deposited stains such as scales can be removed with smaller wiping force or with less wiping frequency than by providing a smooth surface layer. The present invention is based on such a finding.

Solution to Problem

A part according to the present invention is
a part comprising a base material and a surface layer on the base material, wherein
a surface of the part has with a concave and convex structure characterized by the following properties defined in JIS B 0681-2 (2018):
a root mean square height (Sq) of 0.03 µm or more to 1 µm or less,
a skewness of a scale-limited surface (Ssk) of −1 or more to 5 or less, and
an autocorrelation length (Sal) of 10 µm or more to 65 µm or less, and
the surface layer is water-repellent, and exhibits a sputtering time of 5 minutes or less, the sputtering time being a time taken from the start of the sputtering to an end point of the surface layer, and the end point being defined, in a profile obtained by an XPS depth direction analysis of the surface layer, as a point where an absolute value of a difference between a carbon atom concentration at a certain measurement point and a carbon atom concentration at a measurement point just prior to the certain measurement point is 1.0 at % or less.

Effects of Invention

According to the present invention, a sanitary equipment part from which stains deposited thereon, such as scales, can be removed with smaller wiping force or with less wiping frequency is provided.

DESCRIPTION OF INVENTION

1. Part According to the Present Invention

Figure 1:
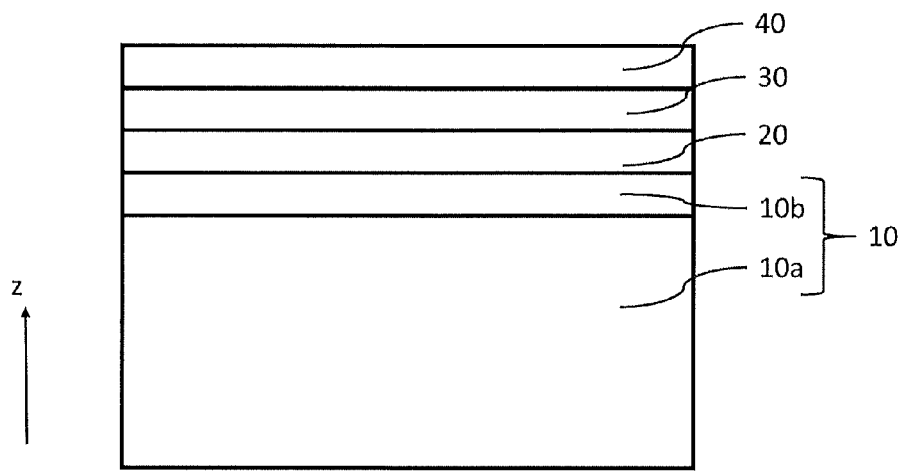
FIG. 1 is a schematic diagram illustrating one example of a part according to the present invention.

A part 1 according to the present invention includes a base material 10 and a surface layer 40 on the base material 10, as illustrated in FIG. 1. The part 1 may further include an intermediate layer 30 and a colored layer 20 between the base material 10 and the surface layer 40.

1-1 Surface Shape of Part

A surface of the part 1, namely, a surface of the surface layer 40 has a concave and convex structure characterized by the following properties defined in JIS B 0681-2 (2018):
  the root mean square height (Sq) of 0.03 μm or more to 1 μm or less,
  the skewness (Ssk) of −1 or more to 5 or less, and
  the autocorrelation length (Sal) of 10 μm or more to 65 μm or less.

The features that the surface of the part 1 not only is water-repellent but also has the concave and convex structure in micrometers order as described above allows the stains such as scales deposited on the surface to be removed with smaller wiping force or with less wiping frequency than a surface having a smooth shape. The reason why the water-repellent surface layer 40 with the concave and convex structure has such high scale removability is described through the mechanism mentioned below. The surface shape of the part 1 can be confirmed by measuring the shape of the surface layer 40.

The concave and convex structure preferably has the following properties:
  the root mean square height (Sq) is 0.04 μm or more to 1 μm or less,
  the skewness (Ssk) is −1 or more to 5 or less, and
  the autocorrelation length (Sal) is 10 μm or more to 55 μm or less.

The concave and convex structure more preferably has the following properties:
  the root mean square height (Sq) of 0.04 μm or more to 1 μm or less,
  the skewness (Ssk) of −1 or more to 5 or less, and
  the autocorrelation length (Sal) of 10 μm or more to 50 μm or less.

The concave and convex structure much more preferably has the following properties:
  the root mean square height (Sq) of 0.10 μm or more to 1 μm or less,
  the skewness (Ssk) of −1 or more to 1 or less, and
  the autocorrelation length (Sal) of 20 μm or more to 55 μm or less.

The concave and convex structure particularly preferably has the following properties:
  the root mean square height (Sq) of 0.10 μm or more to 1 μm or less,
  the skewness (Ssk) of −1 or more to 0 or less, and
  the autocorrelation length (Sal) of 20 μm or more to 50 μm or less.

The materials and properties (water-repellence) of the surface layer 40 are described below.

1-1-1 Mechanism of Scale Removal

The mechanism for removing scales from the surface of the part is described based on the differences in the properties and surface shapes of parts. However, the description below is hypothetical and thus will not limit the scope of the present invention.

On the water-repellent surface of the part according to the present invention, water does not spread, and thus, small and thick scales are formed. Since such scales do not chemically bond to the water-repellent surface, the scales are separated at the interface between the surface and the scales. On the other hand, if the surface is hydrophilic, water spreads widely thereon, and thus, thin and wide scales are formed. Since such scales firmly bond to the hydrophilic surface, the scales are removed by abrasion. Therefore, in a case of removing the scales by wiping, the scales can be removed more easily from the water-repellent surface than from the hydrophilic surface.

The scale formed on the hydrophilic surface is harder than the scale formed on the water-repellent surface, and is firmly bonded to the surface. Therefore, the scale formed on the hydrophilic surface is removed by abrasion at the wiping regardless of whether the hydrophilic surface is smooth or wavy.

As the scales are deposited multiple times on the water-repellent surface, the scales become much thicker. If the water-repellent surface is smooth in this case, the scales are not separated by wiping but are removed by abrasion. Therefore, the burden on the wiping increases.

However, if the water-repellent surface is wavy properly, the burden on the wiping decreases largely. This is because, on the wavy surface, the water droplet contact angle becomes large due to the Cassie-Baxter mode and the pinning effect decreases, and moreover, the scales deposited on the wavy surface become smaller in area than the scales formed on the smooth surface. By these actions, the bonding strength between the scale and the surface decreases. Therefore, the scales are removed easily by separation.

As a side note, even if the water-repellent surface is not smooth, the deposited scales are hard to be removed when the values of Ssk and Sal are low. It is considered that since such a surface has a large number of valley parts that are sharp, scales are formed inside the valley to generate the anchor effect, so that the scales are firmly bonded to the surface.

1-1-2 Measurement of Surface Shape

The surface shape of the part 1 is measured as follows, for example.

Before the measurement, the part 1 is cleaned by lightly rubbing with a urethane sponge using an alkaline detergent, and then sufficiently rinse-washed with ultrapure water. Thereafter, the surface roughness of the part 1 is measured with a laser microscope OLS 4500 (manufactured by Olympus Corporation). A region to be measured is set to have a square size of 645 μm on each side, and focusing on the sample surface at the measurement, the height information is acquired in a high-accuracy mode. In the range of the measurement height, the upper and lower heights where the focus is lost and the screen becomes dark are set as the upper limit and the lower limit.

One example of the laser microscope that can be used to measure the surface shape is as below.

Apparatus: OLS4500
Product version: 1.1.8
Application version: 1.1.8.3
Light source: 405 nm semiconductor laser
Detection system: Photomultiplier
Object lens: OLYMPUS MPlan APO N 20X/0.60 LEXT
Measurement range: 645 μm*645 μm

1-1-3 Calculation of Surface Shape Parameters

The image obtained from the measurement using the aforementioned laser microscope is subjected to tilt correction and then to a filtering process. For the tilt correction, curved surface correction (automatic) of analysis software is used. For the filtering process, an S-filter that removes a small lateral component from the surface and provides a primary surface is used. The S-filter has a cut-off value of 5 μm.

The details of the analysis software that can be used to calculate the surface shape parameters are as follows.
OLS4500 Application (version: 1.1.8.3)
Image processing: image correction, surface correction, and curved surface correction (automatic) are performed on the software to eliminate the tilt derived from the large shape of the base material (profile cross sectional area: 0, process direction: XY direction). Thereafter, a Gaussian filter (S-filter: cut-off value of 5 μm) is used.

The surface (three-dimensional) texture of the part 1 is obtained by using, as indexes, the root mean square height: Sq, the skewness: Ssk, and the autocorrelation length: Sal, which are defined in JIS B 0681-2 (2018).

1-2 Surface Layer

The surface layer 40 in the present invention is a water-repellent layer containing organic molecules, and is transparent and thin enough not to damage the color of other layers provided below the surface layer 40 including the base material 10 and the colored layer 20. Since the surface layer 40 is the water-repellent layer, the adhesion of scales can be suppressed and the scales once adhered can be easily removed in a sanitary equipment part contacting with tap water including silicon and calcium (that causes the formation of scales).

1-2-1 Material or Characteristic of Surface Layer

In the present invention, the surface layer 40 may be a high molecular layer, a low molecular layer, or a mono (molecular) layer.

In the present invention, the high molecular layer is a layer containing a high molecule compound. Furthermore, the low molecular layer is a layer containing a low molecule compound. The high molecule compound and the low molecule compound include a hydrophobic group R. Having the hydrophobic group R confers water-repellency on the surface layer 40.

1-2-1-1 Examples of Hydrophobic Group R

In the present invention, the hydrophobic group R includes an alkyl chain. The hydrophobic group R may include an alkyl chain in which a part of hydrogen atom(s) is substituted with fluorine atom, or an alkyl chain in which a part of carbon atom(s) is substituted with another atom. For example, the hydrophobic group R may include one or more selected from the group consisting of a hydrocarbon group, a fluoroalkyl group, a fluoro(poly)ether group, a fluoroalkoxy group, a fluoroacyl group, an alkoxy group, an acyl group, an alkylthio group, and an alkylamino group.

The hydrophobic group R is preferably a hydrocarbon group consisting of C and H. The hydrocarbon group may be either a saturated hydrocarbon group or an unsaturated hydrocarbon group. The hydrocarbon group may be an open chain hydrocarbon group or a cyclic hydrocarbon group such as an aromatic ring. The hydrophobic group R is preferably an open chain saturated hydrocarbon group, more preferably a straight-chain saturated hydrocarbon group. Since the open chain saturated hydrocarbon group is a flexible molecular chain, it is possible to cover the foundation without gaps and to improve water resistance. When the hydrocarbon group is an open chain hydrocarbon group, the number of carbons is preferably 6 or more to 25 or less, more preferably 10 or more to 18 or less. When the number of carbon atoms is large, the interaction among the molecules is large, so that it is possible to shorten the distance between the molecules in a self-assembled monolayer (SAM) described below, thereby resulting in making it possible to further improve the water resistance.

When the hydrophobic group R is a saturated hydrocarbon group (namely, an alkyl group), a part(s) of hydrogen atoms of the alkyl group may be substituted with another atom. The other atom is, for example, a halogen atom. The halogen atom is, for example, a fluorine atom. The alkyl group in which a part(s) of hydrogen atoms is(are) substituted with a fluorine atom(s) is, for example, a fluoroalkyl group. When the hydrophobic group R includes a fluoroalkyl group, the surface with high water-repellency can be obtained. As a side note, in order to obtain the high scale removability, it is preferable that the surface layer be free of a halogen atom. Furthermore, a part(s) of carbon atom(s) of the alkyl group may be substituted with another atom.

It is preferable that the high molecule compound and the low molecule compound include a functional group capable of bonding to a metal element. The functional group preferably includes one or more selected from the group consisting of a phosphonic acid group, a phosphoric acid group, a phosphinic acid group, a carboxy group, a silanol group (or a precursor of silanol such as an alkoxysilyl group), a β-diol group, an amino group, a hydroxy group, a hydroxyamide group, and an α- or a β-hydroxycarboxylic acid group. More preferably, a phosphonic acid group or a silanol group (or a precursor of silanol such as alkoxysilyl group) is included as the functional group. These functional groups are preferably bonded to a metal element contained in the colored layer 20 or the intermediate layer 30. In other words, it is preferable that the surface layer 40 be bonded to the colored layer 20 or the intermediate layer 30 through these functional groups.

1-2-1-2 Monolayer

In the present invention, the surface layer 40 is a layer containing the hydrophobic group R and a functional group X with coordination to the metal element. The surface layer 40 is preferably a monolayer formed of a single layer, and is more preferably a self-assembled monolayer (SAM) formed of a non-polymeric organic ligand R-X described below. The self-assembled monolayer is a layer in which molecules are assembled densely, and is thus excellent in water-repellency.

The thickness of the SAM is about the same as the length of one constituent molecule. Here, the "thickness" refers to the length of the SAM in a Z direction. Here, in FIG. 1, the Z direction is a direction from the base material 10 to the surface layer 40. The thickness of the SAM is 10 nm or less, preferably 5 nm or less, and more preferably 3 nm or less. In addition, the thickness of the SAM is 0.5 nm or more, and preferably 1 nm or more. In the case of using constituent molecules such that the thickness of SAM falls within such a range, it is possible to efficiently coat the base material 10, and to obtain a sanitary equipment part having excellent removal performance on pollutants including the scales.

In a preferred embodiment of the present invention, the SAM is an aggregate of molecules formed on a surface of a solid in the process of organic molecules adsorbing onto the surface of the solid, and the interaction between the molecules causes the molecules constituting the aggregate to densely aggregate. The SAM preferably contains an alkyl group. As a result, hydrophobic interaction acts between the molecules and allows the molecules to densely assemble, so that it is possible to obtain a sanitary equipment part having excellent stain removability.

In the present invention, the non-polymeric organic ligand R-X includes the hydrophobic group R and the functional group X with coordination to the metal element contained in the colored layer 20 or the intermediate layer 30. The non-polymeric organic ligand R-X is bonded to the surface of the foundation through the functional group X. Here, the term "non-polymeric" refers to a compound that does not correspond to the definition 1.1 in the glossary (in Japanese translation) of basic terms in Polymer Science published by the International Union of Pure and Applied Chemistry (IUPAC) Commission on Polymer Nomenclature (that is, a molecule which has a large relative molecular mass and has a structure constituting of a large number of repetitions of units obtained substantially or conceptually from molecules having a small relative molecular mass, see http://main-.spsj.or.jp/c19/iupac/Recommendations/glossary36.html). The SAM is a layer formed using such a non-polymeric organic ligand R-X.

1-2-1-3 Non-Polymeric Organic Ligand R-X

In a preferred embodiment of the present invention, the surface layer 40 is a layer formed using the non-polymeric organic ligand R-X. The hydrophobic group R may be the aforementioned one. The hydrophobic group R preferably includes a hydrocarbon group consisting of C and H. An atom(s) other than carbon atom may be substituted at one or two positions in the skeleton of the hydrocarbon group included in the hydrophobic group R The atom(s) to be substituted with the atom(s) other than carbon atom may be oxygen, nitrogen, or sulfur. Preferably, one end of the hydrophobic group R (i.e., an end that is not a bonding end to X) is a methyl group. As a result, the surface of the part 1 becomes water-repellent, thereby making it possible to improve the stain removability.

1-2-1-4 Examples of X

In the present invention, the functional group X is preferably at least one selected from a phosphonic acid group, a phosphoric acid group, a phosphinic acid group, a carboxy group, a silanol group (or a precursor of silanol such as an alkoxysilyl group), a β-diol group, an amino group, a hydroxy group, a hydroxyamide group, and an α- or a β-hydroxycarboxylic acid group.

The carboxy group, the β-diol group, the amino group, the hydroxy group, the hydroxyamide group, and the α- or the β-hydroxycarboxylic acid group do not polymerize with one another, and are coordinated to (adsorbing to) the metal element contained in the colored layer 20 or the intermediate layer 30; therefore, a dense surface layer is formed.

According to a preferred embodiment of the present invention, X is at least one selected from a phosphonic acid group, a phosphoric acid group, and a phosphinic acid group among the functional groups containing a phosphorus atom, and X is more preferably a phosphonic acid group. According to another preferred embodiment, X is a silanol group. Thus, a part with high water resistance and excellent removal performance on pollutants can be effectively obtained.

1-2-1-5 Examples of R-X of Monolayer

The organic phosphonic acid compound represented by the general formula R-X is preferably octadecylphosphonic acid, hexadecylphosphonic acid, dodecylphosphonic acid, decylphosphonic acid, octylphosphonic acid, hexylphosphonic acid, perfluorodecylphosphonic acid, perfluorohexylphosphonic acid, or perfluorooctylphosphonic acid, and more preferably octadecylphosphonic acid, hexadecylphosphonic acid, dodecylphosphonic acid, or decylphosphonic acid. Furthermore, octadecylphosphonic acid is much more preferable.

In R-X, phosphonic acid may be used as a molecule with a phosphonic acid group, (organic) phosphoric acid may be used as a molecule with a phosphoric acid group, phosphinic acid may be used as a molecule with a phosphinic acid group, carboxylic acid may be used as a molecule with a carboxy group, protocatechuic acid, gallic acid, dopa, or a catechol(orthohydroxyphenyl) group may be used as a molecule with a β-diol group, amino acid may be used as a molecule with an amino group, alcohol may be used as a molecule with a hydroxy group, hydroxamic acid may be used as a molecule with a hydroxyamide group, and salicylic acid or quinic acid may be used as a molecule with an α- or a β-hydroxycarboxylic acid group.

In the present invention, the surface layer 40 may be formed of two or more types of R-X. The surface layer formed of two or more types of R-X means a surface layer formed of multiple types of the above-mentioned compounds mixed therein. In addition, in the present invention, the surface layer 40 may contain a trace amount of organic molecules other than R-X as long as the scale removability is not impaired.

1-3 Intermediate Layer

In a preferred embodiment of the present invention, the intermediate layer 30 may be provided between the colored layer 20 and the surface layer 40. The intermediate layer 30 can have good adhesion to the surface layer 40 and to the base material 10. A preferable example of the intermediate layer 30 is a layer containing a metal atom and an oxygen atom. In the intermediate layer 30, the metal atom is bonded to the oxygen atom. In other words, the intermediate layer 30 contains a metal element in an oxidized state. In the present invention, the metal element is preferably at least one selected from the group consisting of Cr, Zr, and Si. In addition, it is preferable that the intermediate layer 30 be as thick as or thinner than the surface layer 40 in order not to impair the color tone of the foundation.

1-4 Colored Layer

In a preferred embodiment of the present invention, the colored layer 20 may be provided between the base material 10 and the surface layer 40. The colored layer 20 is a layer exhibiting such a color that at least one absolute value of ΔL*, Δa*, and Δb* of the surface of the part including the colored layer 20 is greater than zero compared to the surface of the part without the colored layer 20. In the present invention, the colored layer 20 is preferably a layer containing Zr or C. In the present invention, the colored layer 20 is more preferably an inorganic layer containing Zr or C. Thus, the part has high durability.

In the present invention, both the intermediate layer 30 and the colored layer 20 may be provided. In this case, it is preferable that the surface layer 40, the intermediate layer 30, and the colored layer 20 be formed in this order from the surface of the part 1. For example, if the colored layer 20 is an inorganic layer containing C, the provision of the intermediate layer 30 can dominantly increase the adhesion of the surface layer 40.

1-5 Base Material

In the present invention, the material of the base material 10 is not particularly limited, and, for example, materials generally used as base materials of the sanitary equipment part can be used.

1-5-1 Support Member 10a of Base Material 10

The base material 10 includes a support member 10a. That is to say, the base material 10 consists of the support member 10a, includes the support member 10a and another element, or includes a region 10b, which is described below, on a surface of the support member 10a, the surface being present on the side of the surface layer 40. The material of the support member 10a may be a metal, resin, ceramic, pottery, or glass.

1-5-2 Region 10b of Base Material 10

The base material 10 may include the region 10b. The region 10b is formed on a surface of the support member 10a, the surface being present on the side of the surface layer. The region 10b is preferably a layer containing a metal, or a layer consisting of an inorganic compound mainly containing carbon. The region 10b can be formed by metal plating or physical vapor deposition (PVD), for example. The region 10b may consist of only metal elements, or may include metal nitrides (such as TiN and TiAlN), metal carbides (such as CrC), metal carbonitrides (such as TiCN, CrCN, ZrCN, and ZrGaCN), or the like. The region 10b may be formed directly on the support member 10a, or may include a different layer between the region 10b and the support member 10a. For example, the base material 10 provided therein the region 10b includes a metal-plated product in which the region 10b is provided by a metal plating treatment on the support member 10a formed of brass or a resin. On the other hand, for example, the base material 10 not provided therein the region 10b includes a metal molded product such as stainless steel (SUS). The shape of the base material 10 is not particularly limited, and may be a simple flat plate shape or a three-dimensional shape, and is preferably the three-dimensional shape.

If the surface layer 40 consists of an organic phosphonic acid compound, the region 10b preferably includes a layer containing one or more metal atoms selected from Ti, Zr, Cr, and Al; and an oxygen atom.

1-6 Identification of Part

In the present invention, the part 1 can be identified by the following method. First, it is confirmed that the surface of the part 1 is water-repellent and that the part 1 has the surface layer 40. Next, the elements constituting the surface layer 40 are identified by XPS measurement. In addition, the thickness of the surface layer 40 and the intermediate layer 30 is obtained by sputtering the respective layers, while measuring the ratio of the elements present therein with the XPS measurement. Next, regarding the identification of the colored layer 20 and the base material 10, the border between the colored layer 20 and the base material 10 is identified by observing the cross section of the layers with SEM. Before the above measurement, pre-treatment is performed in order to remove the stain adhered onto the surface. The details are described below.

1-6-1 Pre-Treatment

In the present invention, the surface of the part 1 is washed before the measurement to sufficiently remove the stains adhered onto the surface. For example, before the measurement, the surface of the part 1 is subjected to wipe washing with ethanol and sponge slide washing with a neutral detergent, and then thorough rinse washing with ultrapure water. In case the part 1 is a rough-surfaced part whose surface has been subjected to hairline processing, shot blasting, or the like, a portion with as high surface smoothness as possible is selected and measured. The portion with high smoothness, which diffuses light more than the rough portion, corresponds to the portion where L* obtained by the SCE method excluding a regular reflection light in the case of measuring the color difference using a spectrometer or the like is less than 5.

In the present invention, when the surface of the part 1 is analyzed, a portion having a relatively large radius of curvature is preferably selected from the surface of the part 1. It is preferable to use the part 1 that is cut into an analyzable size as a measurement sample. At the time of cutting, the portion to be analyzed or evaluated is preferably covered with a film or the like to prevent surface damage.

1-6-2 Identification of Surface Layer

1-6-2-1 Identification of Hydrophobic Group of Surface Layer

In the present invention, the surface layer 40 can be confirmed in detail through the following procedure. First, the water-repellency of the surface layer 40 is evaluated and the formation of the water-repellent surface layer 40 is confirmed. As a method for evaluating the water-repellency, evaluation of a water droplet contact angle described below can be used, for example. The water-repellent surface layer 40 is subjected to surface elemental analysis by the XPS analysis, and thus the elements contained in the surface layer 40 are confirmed.

In the present invention, the fact that the surface layer 40 is a layer containing the hydrophobic group can be confirmed by checking the presence of the alkyl chain contained in the hydrophobic group in accordance with the following procedure.

First, the surface elemental analysis is performed by the XPS analysis, and it is confirmed that the peak at 284 to 285 eV derived from the C-C bond of the alkyl chain contained in the hydrophobic group is detected.

Next, the peak shift ($cm^{-1}$) derived from the hydrophobic group is confirmed using infrared spectroscopy or Surface Enhanced Raman Spectroscopy (SERS).

In the case of using the infrared spectroscopy, reflection absorption spectroscopy can be used. As a measurement device for the reflection absorption spectroscopy, a Fourier transformation infrared spectroscopy (FT-IR) device including an attachment (for example, Seagull manufactured by Harrick Scientific Products Inc.) capable of highly reflective measurement with the infrared ray incidence angle variable to 80° or more can be used. Examples of the infrared spectroscopy device include Cary 630IR (Agilent Technologies Japan, Ltd.) and Nicolet iS50 (Thermo Fisher Scientific K.K.).

The measurement using FT-IR in line with reflection absorption spectroscopy is conducted under the following conditions. Infrared ray incidence angle: 85°, detector: MCT detector, wavenumber resolution: 2 $cm^{-1}$, and cumulative number: 256.

First, only the base material (on which no layer such as the surface layer is formed) that is used in the sanitary equipment part to be measured is measured as a reference. Here, a plate material or the like formed of the same material as the base material to be measured may be used, as an alternative to the base material used in the sanitary equipment part. Then, by measuring the cutout sanitary equipment part 1, the IR spectrum is obtained. In the IR spectrum thus obtained, the horizontal axis represents wavenumber ($cm^{-1}$), and the vertical axis represents transmissivity or absorbance.

In the obtained IR spectrum, it can be confirmed that the surface layer 40 includes the hydrophobic group. The existence of the alkyl chain can be confirmed by detecting the wavenumbers derived from the methyl group of around 2960 $cm^{-1}$ and around 2930 $cm^{-1}$; and the wavenumbers derived from the alkyl chain ($—(CH_2)_1—$) of around 2850 $cm^{-1}$ and around 2920 $cm^{-1}$. In case the hydrophobic group includes the alkyl chain in which a part(s) of hydrogen atom(s) is(are) substituted with fluorine, the existence of the alkyl chain in which the part(s) of hydrogen atom(s) is(are) substituted with fluorine can be confirmed by detecting the wavenumbers of around 1295 $cm^{-1}$, around 1200 $cm^{-1}$, and around 1150 $cm^{-1}$. In case of other hydrophobic groups, the wavenumbers corresponding thereto are checked. When an absorbance value is three times or more of the average of the absorbance values at 100 $cm^{-1}$ which is the minimum value in the measurement range, it is regarded that the corresponding wavenumber is detected and the existence of the corresponding hydrophobic groups is confirmed.

In the case of using surface enhanced Raman spectroscopy, a surface enhanced Raman spectroscopy analyzer including a transmission-type surface enhanced sensor (transmission-type SERS sensor) and a confocal microscope Raman spectrometer is used. The transmission-type surface enhanced sensor may be, for example, the one described in Example 1 of JR 6179905 B. The confocal microscope Raman spectrometer may be, for example, NanoFinder30 (Tokyo Instruments Inc.).

The measurement method using the surface enhanced Raman spectroscopy is described below. The measurement is performed with a transmission-type surface enhanced sensor placed on the surface of the cutout sanitary equipment part 1. The measurement conditions are such that Nd: YAG laser (532 nm, 1.2 mW), scan time (10 seconds), grating (800 Grooves/mm), and pinhole size (100 μm). A Raman spectrum is obtained as a measurement result. In the Raman spectrum, the horizontal axis represents Raman shift ($cm^{-1}$) and the vertical axis represents signal intensity.

In the Raman spectrum thus obtained, the existence of the hydrophobic group can be confirmed by detecting the Raman shift derived from the methyl group of around 2930 $cm^{-1}$, and the Raman shift derived from the alkyl chain ($—(CH_2)_n—$) of around 2850 $cm^{-1}$ and around 2920 $cm^{-1}$. In case the hydrophobic group includes the alkyl chain in which a part(s) of hydrogen atom(s) is(are) substituted with fluorine, the existence of the alkyl chain in which the part(s) of hydrogen atom(s) is(are) substituted with fluorine can be confirmed by detecting the Raman shifts derived from ($—(CF_2)_n—$) of around 735 $cm^{-1}$ and around 1295 $cm^{-1}$. In case of other alkyl groups, the Raman shifts corresponding thereto are checked. It is regarded that the signal of the Raman shift is detected and the existence of the corresponding hydrophobic groups is confirmed when the signal has three times or more signal intensity than the average value of the signal intensities at 100 $cm^{-1}$ which is the minimum signal intensity in the measurement range.

Identification of Hydrophobic Group (R) and X when the Surface Layer is a Monolayer In the present invention, when the surface layer 40 is a layer containing the hydrophobic group R and the functional group X that can be bonded to a metal element, in particular, is a monolayer formed of a single layer, it is possible to identify that the surface layer 40 is the layer containing R and X by the following method.

First, the surface elemental analysis is conducted by XPS analysis and the elements contained in the surface layer 40 are confirmed.

Next, the molecular structure is identified by mass spectrometry from the mass-to-charge ratio (m/z) derived from the molecules of the components existing on the surface. For mass spectrometry, time-of-flight secondary ion mass spectrometry (TOF-SIMS) or high resolution mass spectrometry (HR-MS) can be used. Here, the high resolution mass spectrometry refers to a method capable of measurement with an accuracy of the mass resolution that is less than 0.0001 u (u: unified atomic mass units) or 0.0001 Da, and the elemental composition can be estimated from the precise mass. The HR-MS includes double-focusing mass spectrometry, time-of-flight tandem mass spectrometry Q-TOF-MS), Fourier transform ion cyclotron resonance mass spectrometry (FT-ICR-MS), Orbitrap mass spectrometry, and the like, and time-of-flight tandem mass spectrometry (Q-TOF-MS) is employed in the present invention. For mass spectrometry, it is desirable to use HR-MS when sampling of R and X in a sufficient amount from the part is possible. On the other hand, when sampling of R and X in a sufficient amount from the part is impossible due to the small size of the part or the like, it is desirable to use TOF-SIMS. When mass spectrometry is used, the presence of R and X can be confirmed by detecting the ionic intensity of m/z corresponding to the ionized R and X. Here, it is regarded that an ionic intensity is detected when the ion intensity is three times or more than that of the average value of 50 Da before and after, centering on m/z, which is the lowest value in the range in which the ionic intensity is calculated in the measurement range.

1-6-2-2 TOF-SIMS Measurement Conditions when R and X in the Surface Layer are Recognized As the time-of-flight secondary ion mass spectrometry (TOF-SIMS) device, for example, TOF-SIMS 5 (manufactured by ION-TOF) is used. The measurement conditions are such that primary ions to be emitted: 209Bi3++, primary ion acceleration voltage 25 kV, pulse width 10.5 or 7.8 ns, bunching: on, electrification neutralization: off, post acceleration: 9.5 kV, measurement range (area): about 500*500 µm², secondary ions to be detected: Positive, Negative, Cycle Time: 110 µs, scan count 16. As a measurement result, a secondary ion mass spectrum (m/z) derived from R and X is obtained. In the secondary ion mass spectrum, the horizontal axis represents the mass-to-charge ratio (m/z), and the vertical axis represents the intensity of the detected ions (count).

1-6-2-3 HR/MS Measurement Conditions when R and X in the Surface Layer are Recognized As the high resolution mass spectrometer, a time-of-flight tandem mass spectrometer (Q-TOF-MS), for example, Triple TOF 4600 (manufactured by SCIEX) is used. In the measurement, for example, the cutout base material is immersed in ethanol, and the component (R and X) used for forming the surface layer 40 is extracted with unnecessary components filtered, transferred to a vial (about 1 mL), and then measured. MS/MS measurement is performed under the measurement conditions, ion source: ESI/Duo Spray Ion Source, ion mode (Positive/Negative), IS voltage (−4500 V), source temperature (600° C.), DP (100 V), and CE (40 V), for example. As a measurement result, an MS/MS spectrum is obtained. In the MS/MS spectrum, the horizontal axis represents the mass-to-charge ratio (m/z), and the vertical axis represents the intensity of the detected ions (count).

1-6-2-4 Measurement of Atom Concentration of Each Layer

The composition of the surface layer 40, the intermediate layer 30, and the colored layer 20 is obtained by X-ray photoelectron spectroscopy (XPS). It is preferable that, before the measurement, the part 1 be subjected to sponge sliding with a neutral detergent and then to thorough rinse-washing with ultrapure water. As the XPS device, PHI Quantera II (manufactured by ULVAC-PHI, Inc.) is preferably used. The respective elements are subjected to XPS depth direction analysis using "XPS measurement conditions" and "sputtering conditions 1" each described below, thereby obtaining the spectrum.

The concentration of the detected atoms can be calculated from the obtained spectrum by using data analysis software PHI MultiPak (manufactured by ULVAC-PHI, Inc.). For the obtained spectrum, the Shirley method is carried out on the measured peaks based on the electron orbits of the atoms to remove the background, and thereafter the peak area intensity is calculated. Correction processing is performed by dividing the peak area intensity by the sensitive factors which is unique to the device and is pre-set in the data analysis software. The ratio of the peak area of a certain element after the correction to the total peak area intensity of all the measured elements after the correction is defined as the atom concentration of the object and calculated in terms of at. %.

It is noted that XPS is a method of performing energy analysis by irradiating a sample surface with soft X-ray and capturing photoelectrons emitted as the sample surface is ionized, and the obtained spectrum exhibits the photoelectron peak emitted from each electron orbit, so that an element is expressed as the symbol for the element + the electron orbit therefor (for example, the photoelectron peak obtained from the 1 s orbit of carbon is expressed as C1s).

1-6-2-5 XPS Measurement Conditions

In all the XPS measurements described herein, the following "XPS measurement conditions" are used.
XPS Measurement Conditions
  X-ray condition: monochromatic AlKa ray, 25 W, 15 kV
  Analysis area: 100 µmφ
  Charge neutralizer setting: 1.0 V, 10 µA
  Photoelectron take-off angle: 45°
  Time per step: 50 ms
  Sweep: five times
  Pass energy: 112 eV
  Element to be analyzed (energy range): Zr3d (177-187 eV), C1s (281-296 eV), N1s (394-406 eV), O1 s (524-540 eV), Cr2p3 (572-582 eV), Ti2p (452-463 eV), Si2p (98-108 eV)

In the present invention, the element composition in the depth direction of each layer and the like are identified by performing the depth direction analysis with a combination of the XPS measurement and the sputtering using Ar ions. In the present invention, the depth direction analysis with a combination of the XPS measurement and the sputtering using Ar ions is referred to as "XPS depth direction analysis". In the XPS depth direction analysis, the sputtering using Ar ions and the XPS measurement are alternately repeated. As the conditions in the XPS measurement, "XPS measurement conditions" described above can be used. As the conditions at the sputtering (hereinafter also referred to as "sputtering conditions"), the following conditions can be used. The XPS measurement is performed for the respective "sputtering cycle"s in the respective sputtering conditions. By the XPS depth direction analysis, the spectrum information is obtained. From this spectrum information, the depth profile (profile) of the element composition is acquired. From this profile, the element composition in the depth direction can be identified.

1-6-2-6 Sputtering Conditions 1 at the XPS Depth Direction Analysis (Hereinafter Referred to as "Sputtering Conditions 1")

Inert gas species: Ar
Sputtering voltage: 500 V
Sputtering range: 2 mm*2 mm
Sputtering cycle: 10 seconds It is noted that the sputtering voltage is the voltage that is applied to an Ar ion gun, and the sputtering range is the range on the surface that is cut by sputtering. The sputtering cycle is the time for which Ar gas is emitted continuously for each measurement in the depth direction, and the total of the sputtering cycles is a sputtering time.

1-6-2-7 Thickness of Surface Layer

In the present invention, the surface layer 40 has a sputtering time of 5 minutes or less, preferably 3 minutes or less, the sputtering time being a time taken from the start of the sputtering from an end point of the surface layer, and the end point being defined, in a profile obtained by the XPS depth direction analysis, as a point where an absolute value of a difference between a carbon atom concentration at a certain measurement point and a carbon atom concentration at a measurement point just prior to the certain measurement point is 1.0 at % or less. In addition, the lower limit value of the sputtering time is preferably 1 minute or more. The preferable range may be determined by combining these upper limit value and lower limit value as appropriate. This time acts as the index of the thickness of the surface layer. In this manner, the surface layer is a thin layer that is not visually recognizable, and can impart its function to the part while maintaining the color tone of the base material. Here, the "profile obtained by the XPS depth direction analysis" refers to the profile obtained by performing the XPS depth direction analysis using the "XPS measurement conditions" and "sputtering conditions 1" described above. In addition, in the XPS depth direction analysis, it is preferable that three points be selected at random and be measured, and the average of these three points is determined to be the thickness of the surface layer,

1-6-3 Preferable Carbon Atom Concentration in Surface Layer 40

In the present invention, in case the surface layer 40 contains the hydrocarbon group, the carbon atom concentration of the surface layer 40 is preferably 35 at % or more, more preferably 40 at % or more, much more preferably 43 at % or more, and the most preferably 45 at % or more. In addition, the carbon atom concentration is preferably less than 70 at %, more preferably 65 at % or less, and much more preferably 60 at % or less. The preferable range of the carbon atom concentration may be determined by the appropriate combination of these upper limit value and lower limit value. Adjusting the carbon atom concentration within this range can enhance the scale removability,

1-6-4 Preferable Metal Atom Concentration of Surface Layer 40

In the present invention, the metal atom concentration of the surface layer 40 is preferably 1.0 at % or more to less than 10 at %. Adjusting the metal atom concentration within this range allows the surface layer 40 to be dense. Thus, the sanitary equipment part with sufficient water resistance and excellent scale removability can be obtained. More preferably, the metal atom concentration is 1.5 at % or more to less than 10 at %. Accordingly, the water resistance and the scale removability can be further enhanced.

1-6-5 Preferable Water Repellency of Surface Layer 40

The water droplet contact angle on the sanitary equipment part 1 according to the present invention, that is, the surface layer 40 is preferably 90° or more, more preferably 100° or more. The water droplet contact angle means a static contact angle, and is obtained by dropping 2 µl of water droplet on the surface layer 40 and photographing the water droplet after one second from the side surface of the base material. As the measurement device, for example, a contact angle meter (model number: SDMs-401 manufactured by Kyowa Interface Science Co., Ltd.) can be used.

1-6-6 Identification of Intermediate Layer

In the present invention, whether the part 1 includes the intermediate layer 30 can be identified by the XPS depth direction analysis. First, the XPS depth direction analysis is performed for 10 minutes using the "XPS measurement conditions" and the "sputtering conditions 1", and confirmed is the metal element detected by 10 at % or more at the point where the difference in carbon atoms detected between a certain measurement point and a measurement point just prior to the certain measurement point becomes 1.0 at % or less. In case the concentration of the element becomes 3.0 at % or less after ten-minute analysis, the range where the element exists can be determined to be the intermediate layer. In case the concentration of the element does not decrease to 3.0 at % or less after ten-minute analysis, it is determined that the part does not include the intermediate layer.

1-6-7 Identification of Colored Layer and Base Material

In the present invention, the colored layer 20 can be identified by the following method. First, the part 1 is cut in a direction perpendicular to the stacking direction of the layers (in the Z direction shown in FIG. 1), and the resulting surface is milled using an ion milling device to obtain a smooth cross section. By observing the cross section with a scanning electron microscope/energy dispersive X-ray spectroscopy (SEM/EDX), the colored layer and the base material can be identified. For the observation region, a SEM image is acquired so that the interface between the colored layer 20 and the base material 10 exists in the SEM image. By performing the mapping analysis with EDX on the SEM image, the element distribution in the colored layer and in the base material can be visually confirmed. A boundary surface where different element distributions is confirmed is identified as the boundary surface between the colored layer 20 and the base material 10. Thus, the colored layer 20 can be identified.

1-7 Manufacturing Method for Part 1

The part 1 according to the present invention is preferably manufactured by a method including:
(a) a step of providing a base material, a surface of which having a concave and convex structure characterized by the following properties defined in JIS B 0681-2 (2018):
a root mean square height (Sq) of 0.03 µm or more to 1 µm or less,
a skewness (Ssk) of −1 or more to 5 or less, and
an autocorrelation length (Sal) of 10 µm or more to 65 µm or less; and
(b) a step of forming a surface layer on the surface of the base material having the concave and convex structure.

The concave and convex structure on the surface of the base material is in micrometers order, and the thickness of the surface layer is in nanometers order; therefore, employing the manufacturing method as described above can form the surface layer without deteriorating the water-repellency.

Between the step (a) and the step (b), a step of plating the surface of the base material having the concave and convex structure may be further included.

In the present invention, preferably, the step (a) includes
(a1) a step of providing a support member, and
(a2) a step of manufacturing the base material by forming a concave and convex structure on a surface of the support member, the concave and convex structure being characterized by the following properties defined in JIS B 0681-2 (2018):
a root mean square height (Sq) of 0.03 µm or more to 1 µm or less,
a skewness (Ssk) of −1 or more to 5 or less, and an autocorrelation length (Sal) of 10 µm or more to 65 µm or less.

In the present invention, preferably, a step of plating a surface of the support member to manufacture the support member including a plated layer on the surface thereof is further included between the step (a1) and the step (a2).

1-8 Application of Part

In the present invention, the "sanitary equipment" is a water supply and drainage equipment of a building or indoor equipment, and is preferably indoor equipment. Furthermore, it is preferably used in an environment exposed to water such as water for domestic use (or water for industrial use).

In the present invention, the environment exposed to water may be any place where water is used, and includes places where water is used, such as houses and public facilities like as parks, commercial facilities, and offices. Such places preferably include bathrooms, toilet spaces, dressing rooms, washrooms, kitchens, and the like.

In the present invention, the indoor equipment is used in houses and public facilities such as commercial facilities and is touched by humans. The indoor equipment is preferably equipment used in bathrooms, toilet spaces, dressing rooms, washrooms, kitchens, and the like. The sanitary equipment part of the present invention used as indoor equipment includes products such as plated or PVD-coated equipments. Specific examples include faucets, drain fittings, water blocking fittings, washbasins, doors, shower heads, shower bars, shower hooks, shower hoses, handrails, towel hangers, kitchen counters, kitchen sinks, drainage baskets, kitchen hoods, ventilation fans, drains, toilet bowls, urinals, electronic bidets, lids for electronic bidets, nozzles for electronic bidets, operation panels, operation switches, operation levers, handles, and doorknobs. The sanitary equipment part according to the present invention is preferably a faucet, a faucet fitting, a drain fitting, a water blocking fitting, a washbasin, a shower head, a shower bar, a shower hook, a shower hose, a handrail, a towel hanger, a kitchen counter, a kitchen sink, or a drainage basket. In particular, the sanitary equipment part of the present invention can be suitably used as a faucet, or as a part used in the bathroom or toilet spaces. These products including the faucet are used in the application where the surface of the part is exposed to the water for domestic use; therefore, scales are easily formed on the surface. By the use of the part according to the present invention as these products, the effect of the present invention is exhibited sufficiently enough to remove the deposited stains such as scales with smaller wiping force or with less wiping frequency.

The surface of the sanitary equipment part according to the present invention is used as a surface facing down or a back surface of a faucet, or a part constituting a toilet, or a part constituting a bathroom. That is to say, the surface facing down or the back surface of the faucet, or the part constituting a toilet, or the part constituting a bathroom preferably has the surface layer of the sanitary equipment part according to the present invention. Since the scales are deposited the most easily on the surface facing down or the back surface of the faucet or the like, applying the surface of the part according to the present invention for the surface facing down or the back surface of the faucet or the like makes the most of the effect of the present invention to remove the deposited stains such as scales with smaller wiping force or with less wiping frequency.

Figure 2:
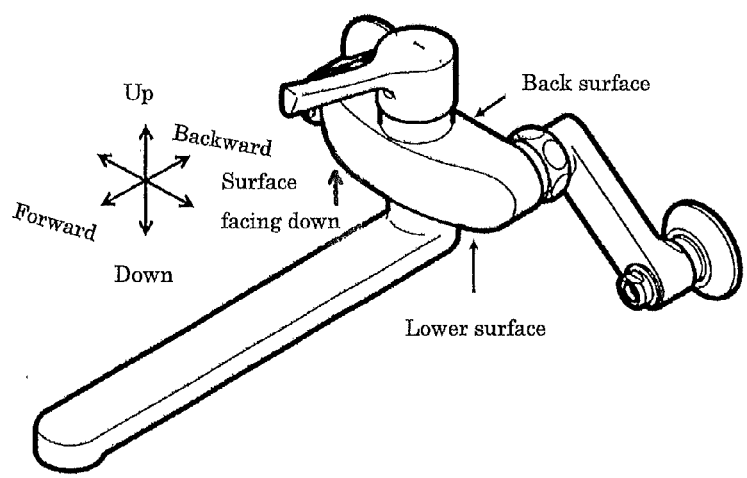
FIG. 2 is a perspective diagram of a faucet as an example of a product to which the part according to the present invention is applied, while illustrating portions (surface facing down and back surface) of the faucet to which the surface of the part according to the present invention is favorably applied.
Figure 3:
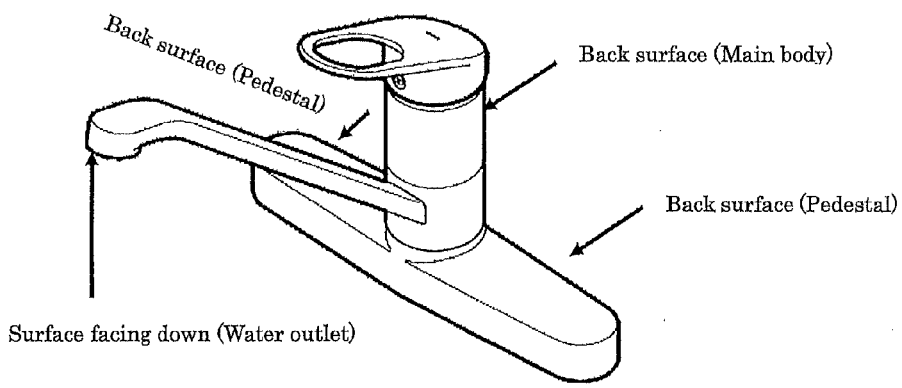
FIG. 3 is a perspective diagram of a faucet as an example of a product to which the part according to the present invention is applied, while illustrating portions (surface facing down and back surface) of the faucet to which the surface of the part according to the present invention is favorably applied.

The part where the effect of the present invention is sufficiently exhibited corresponds to, for example if it is the faucet, a surface facing down and a back surface of a single-lever faucet on the wall as indicated by arrows in FIG. 2, and moreover, a back surface (of the main body and of the pedestal) and a surface facing down (of the water outlet) of a single-lever faucet on the pedestal as indicated by arrows in FIG. 3. Specifically, a part or an internal corner portion constituting the water outlet, a surface facing down of a lever handle, a back surface of the pedestal, a back surface of a leg part (attachment part) connecting between the faucet main body and the wall, and the like are included. In the cleaning, such portions are not within the easy reach of a hand compared to a front surface and an upper surface of the faucet, and it is hard to apply a force onto the portion; therefore, the scales are easily deposited and the scales thus deposited remain as visible stains. By providing the concave and convex shape described in the present invention onto such portions, the scales can be removed with less wiping frequency, and thus, the appearance of the part can be maintained,

EXAMPLES

The present invention is described in more detail with reference to the following examples. The present invention, however, is not limited to these examples.

Manufacture of Part

Example 1

A brass plate was plated with nickel, and then an uneven shape was formed on a surface of the resulting plate by using a dry blast device (product name: PNEUMA BLASTER SGF-4(B), manufactured by Fuji Manufacturing Co., Ltd.). Thereafter, a surface of the resulting plate was plated with chromium to manufacture a base material.

The blasting conditions were as follows. That is to say, a round gun with a diameter of 12 mm was used as a blast gun. The air pressure was 0.20 MPa, the projection distance was 200 mm, and the process time was 1 s/cm$^2$. FZB120 (manufactured by Fuji Manufacturing Co., Ltd.) was used as an abrasive.

Next, a surface layer containing a hydrocarbon group was formed in accordance with the following procedure.

First, in order to remove stains present on the surface of the base material, the base material was ultrasonically washed with an aqueous solution containing an alkali detergent. Thereafter, the surface of the base material was exposed to running water to remove the detergent. Furthermore, the base material was immersed in ion-exchanged water and was rinse-washed by ultrasonic cleaning to remove water with an air duster.

Next, the base material was immersed in a 2.5-M sodium hydroxide aqueous solution for 5 minutes at 50° C., and then was rinse-washed thoroughly with ion-exchanged water.

As a treatment agent for forming a surface layer, a solution in which octadecylphosphonic acid (ODPA) (manufactured by Tokyo Chemical Industry Co., Ltd., product code O0371) was dissolved in ethanol (manufactured by FUJIFILM Wako Pure Chemical Corporation, Wako 1st Grade) was used. The base material was immersed in the treatment agent for 1 minute or more, and was washed with ethanol. Thereafter, the base material was dried in a drier for 10 minutes at 120° C. to form the surface layer on the surface of the base material. The part of Example 1 was thus manufactured.

Example 2

A brass plate was rubbed with sandpaper (product name: FRCC-SDS No. 180, manufactured by Nihon Kenshi Co., Ltd.) about 20 times in only one direction so that a striped concave and convex shape was formed on a surface thereof, and thereafter, the resulting plate was plated with nickel chromium to manufacture a base material.

Next, a surface layer was formed on the surface of the base material in the same manner as that in Example 1 to manufacture the part of Example 2.

Example 3

The part of Example 3 was manufactured in the same manner as that in Example 2 except that another sandpaper (product name: FRCC-SDS No. 600, manufactured by Nihon Kenshi Co., Ltd.) was used.

Example 4

A brass plate was rubbed with sandpaper (product name: FRCC-SDS No. 180, manufactured by Nihon Kenshi Co., Ltd.) about 20 times in only one direction so that a striped concave and convex shape was formed on a surface thereof, and thereafter, the resulting plate was plated with nickel chromium to manufacture a base material.

Next, a surface layer containing a fluorocarbon group was formed in accordance with the following procedure.

First, in order to remove stains present on the surface of the base material, the base material was ultrasonically washed with an aqueous solution containing an alkali detergent. Thereafter, the surface of the base material was exposed to running water to remove the detergent. Furthermore, the base material was immersed in ion-exchanged water and was rinse-washed by ultrasonic cleaning to remove water with an air duster.

Next, the base material was irradiated with UV light (wavelength: 254 nm, irradiation intensity: about 15 mW/cm$^2$) for 10 minutes.

Thereafter, a nonwoven fabric (product name: BEMCOT M3-II, manufactured by Asahi Kasei Corporation) was impregnated with a solution in which silicone primer (product name: KBM403, manufactured by Shin-Etsu Chemical Co., Ltd.) was dissolved in isopropyl alcohol (manufactured by FUJIFILM Wako Pure Chemical Corporation), and the solution was spread over the entirety of the base material, and then, the resulting base material was dried naturally for 10 minutes to form thereon an intermediate layer.

As a treatment agent for forming a surface layer, a coating agent containing an alkyl fluoride group (product name: SURECO2101S, manufactured by AGC Inc.) was used. A nonwoven fabric (product name: BEMCOT M3-II, manufactured by Asahi Kasei Corporation) was impregnated with the treatment agent, and the treatment agent was spread over the entirety of the base material, and then, the resulting base material was dried in a drier for 30 minutes at 120° C. to form the surface layer on the surface of the base material.

The part of Example 4 was thus manufactured.

Example 5

The part of Example 5 was manufactured in the same manner as that in Example 4 except that another sandpaper (product name: FRCC-SDS No, 600, manufactured by Nihon Kenshi Co., Ltd.) was used.

Example 6

A concave and convex shape as well as a surface layer were formed on a back surface of a single-lever faucet on the wall (product number: TKS05315J, manufactured by TOTO LTD.) shown in FIG. 2 in the same manner as that in Example 2 to manufacture the part of Example 6.

Example 7

A concave and convex shape as well as a surface layer were formed on a surface facing down of a single-lever faucet on the wall (product number: TKS05315J, manufactured by TOTO LTD.) shown in FIG. 2 in the same manner as that in Example 2 to manufacture the part of Example 7.

Examples 8 and 9

A concave and convex shape as well as a surface layer were formed on the base material, which was manufactured by the same method as that in Example 1, in the same manner as that of Example 4 except that a coating agent containing a high molecule compound having a silanol group at a terminal end and having perfluoropolyether in a part of a molecular chain (silane compound containing a perfluoropolyether group) was used as the coating agent for forming the surface layer to manufacture the part of Example 8 and 9.

Example 10

A surface layer were formed on the base material, which was manufactured by the same method as that in Example 2, in the same manner as that in Example 4 except that a coating agent containing silane compound containing a perfluoropolyether group was used as the coating agent for forming the surface layer to manufacture the part of Example 10.

Example 11

As a treatment agent for forming a surface layer, a solution in which (1H, 1H, 2H, 2H-perfluorodecyl) phosphonic acid (Tokyo Chemical Industry Co., Ltd.) was dissolved in ethanol (FUJIFILM Wako Pure Chemical Corporation, Wako 1st Grade) was used. The base material manufactured by the same method as that in Example 2 was immersed in the treatment agent for 1 minute or more, and was washed with ethanol. Thereafter, the resulting base material was dried in a drier for 10 minutes at 120° C. to form the surface layer on the surface of the base material.

Comparative Example 1

A brass plate was plated with nickel chromium, and thereafter, a surface of the resulting plate was buffed with an automatic abrasive machine (manufactured by BUEHLER) to manufacture a base material. As the abrasive particles, alumina particles with an average particle diameter of 0.05 μm were used.

Next, a surface layer was formed on the surface of the base material in the same manner as that in Example 1 to manufacture the part of Comparative example 1.

Comparative Example 2

A surface layer was formed on a surface of the base material used in Example 1 in the same manner as that in Example 4 to manufacture the part of Comparative example 2.

Comparative Example 3

A brass plate was plated with nickel, and thereafter, a surface of the resulting plate was subjected to hairline processing and then was plated with chromium to manufacture a base material.

Next, a surface layer was formed on a surface of the base material in the same manner as that in Example 1 to manufacture the part of Comparative example 3.

Comparative Example 4

A surface layer was formed on a surface of the base material used in Example 1 in the same manner as that in Example 4 to manufacture the part of Comparative example 4.

Comparative Example 5

The part of Comparative example 5 was manufactured in the same process as that in Example 1 except that the air pressure in the dry blast device was 0.25 MPa.

Comparative Example 6

The part of Comparative example 5 was manufactured in the same process as that in Example 1 except that the air pressure in the dry blast device was 0.30 MPa.

Comparative Example 7

A brass plate was plated with nickel chromium to manufacture a base material. A surface layer was formed on a surface of the base material in the same manner as that in Example 8 to manufacture the part of Comparative example 7.

Performance Test

Each of the parts manufactured as above was subjected to the following test.

Scale Removability Test

On the surface of each part that was heated at 50° C. in a drying furnace, 200 μl of tap water was dropped, and the part was left until the liquid was dried. This operation was regarded as one cycle. The same operation was repeated once again, that is, tap water was dropped once again on the scales formed after one cycle, and the part was dried, and thus, the scales for two cycles were formed. The same operation was repeated and the scales for three cycles and for five cycles were obtained. The parts with the scales formed thereon were evaluated in accordance with the following procedure.
  (i) A dry cloth was slid back and forth five times while a light load (80 gf/cm$^2$) was applied to the surface of the part.
  (ii) The test ends when the removal of the scales was confirmed. If the scales still exist, (i) was repeated.

It is noted that whether scales were removed was assessed by visually inspecting whether the scales remained on the surface of the part after the surface of the part was washed with running water and the water was removed with an air duster.

On the basis of the number of sliding times required to remove the scales in the procedures of (i) and (ii), the scale removability was evaluated as below:

| | |
|---|---|
| Removed by 5 times | three (3) points |
| Removed by 10 times | two (2) points |
| Removed by 15 times | one (1) point |
| Not removed by 15 times | zero (0) points |

The evaluation results were shown in Tables 1 and 2.

Measurement of Properties

The parts manufactured as described above were subject to the following measurements.

Measurement of Surface Shape

Before the measurement, each part was cleaned by lightly rubbing with a urethane sponge using an alkaline detergent, and then was sufficiently rinse-washed with ultrapure water. Thereafter, the surface roughness of each part was measured with a laser microscope OLS4500 (manufactured by Olympus Corporation). A region to be measured was set to have a square size of 645 μm on each side. Focusing on the sample surface at the measurement, the height information was acquired in a high-accuracy mode. In the range of the measurement height, the upper and lower heights where the focus was lost and the screen became dark were set as the upper limit and the lower limit. In the measurement, ten points in each part were measured, and the average value of a total of six points excluding two points with large values and two points with small values among the obtained results was used as the result.

It is noted that the laser microscope with the following structure was used.
  Apparatus: OLS4500
  Product version: 1.1.8
  Application version: 1.1.8.3
  Light source: 405 nm semiconductor laser
  Detection system: Photomultiplier
  Object lens: OLYMPUS MPlan APO N 20X/0.60 LEXT
  Measurement range: 645 μm*645 μm

Calculation of Surface Shape Parameters

An image obtained from the measurement with the laser microscope was subjected to tilt correction and then to a filtering process. For the tilt correction, curved surface correction (automatic) of analysis software was used. For the filtering process, an S-filter that removes a small lateral component from the surface and provides a primary surface was used. The S-filter had a cut-off value of 5 μm.

The details of the analysis software used are as follows.
OLS4500 Application (Version: 1.1.8.3)
Image processing: image correction, surface correction, and curved surface correction (automatic) were performed on the software to eliminate the tilt derived from the large shape of the base material (profile cross sectional area: 0, process direction: XY direction). Thereafter, a Gaussian filter (S-filter: cutoff value of 5 μm) was used.

The surface (three-dimensional) texture of each sample was obtained by using, as indexes, the root mean square height: Sq, the skewness: Ssk, the autocorrelation length: Sal, which are defined in JIS B 0681-2 (2018). The measurement values of Sq, Ssk, and Sal are shown in Tables 1 and 2.

Measurement of Thickness of Surface Layer

The XPS depth direction analysis was performed using the "XPS measurement conditions" and the "sputtering conditions 1" described above, and thus the profile was obtained. In this profile, the point where the absolute value of the difference between the carbon atom concentration at a certain measurement point and the carbon atom concentration at a measurement point just prior to the certain measurement point became 1.0 at % or less was regarded as an end point of the surface layer. The sputtering time (minutes) taken from the start of the sputtering to the end point is shown in Tables 1 and 2.

Confirmation of Hydrophobic Group Contained in Surface Layer

By the following method, it was confirmed that the surface layer contained the hydrophobic group. It was confirmed using the surface enhanced Raman spectroscopy. As the surface enhanced Raman spectroscopy analyzer, the following analyzer was used. As the surface enhanced Raman sensor, a transmission-type surface enhanced Raman sensor described in Example 1 of JP 6179905 B was used. As the confocal microscope Raman spectrometer, NanoFinder30 (Tokyo Instruments Inc.) was used. In the measurement, the transmission-type surface enhanced Raman sensor was disposed on the surface of the cut-out part. The measurement conditions were such that Nd: YAG laser (532 nm, 1.2 mW), scan time (10 seconds), grating (800 Grooves/mm), and pinhole size (100 μm).

In Examples 1 to 3, 6, and 7, the signal peaks were detected in the Raman shifts 2850 cm$^{-1}$ and 2920 cm$^{-1}$ each derived from —$(CH_2)_n$— included in the alkyl chain. In Examples 4, 5, and 8 to 11, the signal peaks were detected in the Raman shifts 735 cm$^{-1}$ and 1295 cm$^{-1}$ each derived from —$(CF_2)_1$— included in the alkyl chain in which parts of hydrogen atoms were substituted with fluorine.

TABLE 1

| | | | Example 1 | Example 2 | Example 3 | Example 4 |
|---|---|---|---|---|---|---|
| Structure of part | Base material | | Brass was plated with nickel, and dry-blasted (with air pressure 0.20 MPa), and plated with chromium. | Brass was rubbed with #180 sandpaper, and plated with nickel chromium. | Brass was rubbed with #600 sandpaper, and plated with nickel chromium. | Brass was rubbed with #180 sandpaper, and plated with nickel chromium. |
| | Intermediate layer | | None | None | None | Si primer |
| | Surface layer | | Alkylphosphonic acid | Alkylphosphonic acid | Alkylphosphonic acid | Alkyl fluoride polymer |
| | Film thickness | sputtering time taken from the start of sputtering to an end point of the surface layer, wherein the end point is defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less (within 5 mins) | 1 | 1 | 1 | 3 |
| Properties of part surface | Parameters of waviness | Sq (0.03 μm or more, 1 μm or less) | 0.95 | 0.19 | 0.03 | 0.16 |
| | | Ssk (−1 or more and 5 or less) | −0.61 | −0.24 | −0.11 | −0.06 |
| | | Sal (10 μm or more, 65 μm or less) | 21.7 | 49.5 | 47.2 | 34.1 |
| Performance of part | Scale removability | Scale deposition frequency: 1 cycle/point | 3 | 3 | 3 | 3 |
| | | Scale deposition frequency: 3 cycles/point | 3 | 3 | 2 | 3 |
| | | Scale deposition frequency: 5 cycles/point | 3 | 2 | 1 | 2 |

| | | | Example 5 | Example 6 | Example 7 | Example 8 |
|---|---|---|---|---|---|---|
| Structure of part | Base material | | Brass was rubbed with #600 sandpaper, and plated with nickel chromium. | Back surface of on-wall single-lever faucet (product number: TKS05315J, manufactured by TOTO) | Lower surface of on-wall single-lever faucet (product number: TKS05315J, manufactured by TOTO) | Brass was plated with nickel, and dry-blasted (with air pressure 0.20 MPa), and plated with chromium. |

TABLE 1-continued

| | | | | | | |
|---|---|---|---|---|---|---|
| | Intermediate layer | | Si primer | None | None | Si primer |
| | Surface layer | | Alkyl fluoride polymer | Alkylphosphonic acid | Alkylphosphonic acid | Silane compound containing perfluoropolyether group |
| | Film thickness | sputtering time taken from the start of sputtering to an end point of the surface layer, wherein the end point is defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less (within 5 mins) | 3 | 1 | 1 | 1 |
| Properties of part surface | Parameters of waviness | Sq (0.03 µm or more, 1 µm or less) | 0.04 | 0.17 | 0.69 | 0.94 |
| | | Ssk (−1 or more and 5 or less) | −0.31 | 0.012 | −0.08 | −0.55 |
| | | Sal (10 µm or more, 65 µm or less) | 45.2 | 34.35 | 62.9 | 21.8 |
| Performance of part | Scale removability | Scale deposition frequency: 1 cycle/point | 2 | 3 | 3 | 3 |
| | | Scale deposition frequency: 3 cycles/point | 2 | 3 | 3 | 2 |
| | | Scale deposition frequency: 5 cycles/point | 0 | 2 | 2 | 2 |

| | | | Example 9 |
|---|---|---|---|
| Structure of part | | Base material | Brass was plated with nickel, and dry-blasted (with air pressure 0.20 MPa), and plated with chromium. |
| | | Intermediate layer | Si primer |
| | | Surface layer | Silane compound containing perfluoropolyether group |
| | Film thickness | sputtering time taken from the start of sputtering to an end point of the surface layer, wherein the end point is defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less (within 5 mins) | 2 |
| Properties of part surface | Parameters of waviness | Sq (0.03 µm or more, 1 µm or less) | 0.82 |
| | | Ssk (−1 or more and 5 or less) | −0.57 |
| | | Sal (10 µm or more, 65 µm or less) | 22.9 |
| Performance of part | Scale removability | Scale deposition frequency: 1 cycle/point | 3 |
| | | Scale deposition frequency: 3 cycles/point | 3 |
| | | Scale deposition frequency: 5 cycles/point | 3 |

|  |  |  | Example 10 | Example 11 | Comparative example 1 |
|---|---|---|---|---|---|
| Structure of part | Base material |  | Brass was rubbed with #180 sandpaper, and plated with nickel chromium. | Brass was rubbed with #180 sandpaper, and plated with nickel chromium. | Brass was plated with nickel chromium, and was buffed. |
|  | Intermediate layer |  | Si primer | None | None |
|  | Surface layer |  | Silane compound containing perfluoropolyether group | Perfluorodecylphosphonic acid | Alkylphosphonic acid |
|  | Film thickness | sputtering time taken from the start of sputtering to an end point of the surface layer, wherein the end point is defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less (within 5 mins) | 2 | 1 | 1 |
| Properties of part surface | Parameters of waviness | Sq (0.03 μm or more, 1 μm or less) | 0.15 | 0.18 | 0.03 |
|  |  | Ssk (−1 or more and 5 or less) | 0.12 | −0.37 | −0.18 |
|  |  | Sal (10 μm or more, 65 μm or less) | 52.4 | 46.4 | 77.9 |
| Performance of part | Scale removability | Scale deposition frequency: 1 cycle/point | 3 | 3 | 3 |
|  |  | Scale deposition frequency: 3 cycles/point | 3 | 3 | 1 |
|  |  | Scale deposition frequency: 5 cycles/point | 3 | 2 | 1 |

|  |  |  | Comparative example 2 | Comparative example 3 | Comparative example 4 |
|---|---|---|---|---|---|
| Structure of part | Base material |  | Brass was plated with nickel chromium, and was buffed. | Brass was plated with nickel, hairline-processed, and plated with chromium. | Brass was plated with nickel, hairline-processed, and plated with chromium. |
|  | Intermediate layer |  | Si primer | None | Si primer |
|  | Surface layer |  | Alkyl fluoride polymer | Alkylphosphonic acid | Alkyl fluoride polymer |
|  | Film thickness | sputtering time taken from the start of sputtering to an end point of the surface layer, wherein the end point is defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less (within 5 mins) | 3 | 1 | 3 |
| Properties of part surface | Parameters of waviness | Sq (0.03 μm or more, 1 μm or less) | 0.02 | 0.19 | 0.15 |
|  |  | Ssk (−1 or more and 5 or less) | 0.20 | −1.96 | −1.52 |
|  |  | Sal (10 μm or more, 65 μm or less) | 55.3 | 8.4 | 6.6 |
| Performance of part | Scale removability | Scale deposition frequency: 1 cycle/point | 3 | 0 | 0 |
|  |  | Scale deposition frequency: 3 cycles/point | 0 | 0 | 0 |
|  |  | Scale deposition frequency: 5 cycles/point | 0 | 0 | 0 |

-continued

| | | | Comparative example 5 | Comparative example 6 | Comparative example 7 |
|---|---|---|---|---|---|
| Structure of part | Base material | | Brass was plated with nickel, and dry-blasted (with air pressure 0.25 MPa), and plated with chromium. | Brass was plated with nickel, and dry-blasted (with air pressure 0.30 MPa), and plated with chromium. | Brass was plated with nickel chromium. |
| | Intermediate layer | | None | None | Si primer |
| | Surface layer | | Alkylphosphonic acid | Alkylphosphonic acid | Silane compound containing perfluoropolyether group |
| | Film thickness | sputtering time taken from the start of sputtering to an end point of the surface layer, wherein the end point is defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less (within 5 mins) | 1 | 1 | 1 |
| Properties of part surface | Parameters of waviness | Sq (0.03 μm or more, 1 μm or less) | 1.37 | 2.68 | 0.06 |
| | | Ssk (−1 or more and 5 or less) | −0.21 | 0.06 | 0.50 |
| | | Sal (10 μm or more, 65 μm or less) | 23.6 | 32.8 | 112.5 |
| Performance of part | Scale removability | Scale deposition frequency: 1 cycle/point | 2 | 0 | 2 |
| | | Scale deposition frequency: 3 cycles/point | 0 | 0 | 1 |
| | | Scale deposition frequency: 5 cycles/point | 0 | 0 | 0 |

REFERENCE SIGNS LIST

1: Part
10: Base material
10a: Support member of Base material 10
10b: One region of Base material 10
20: Colored layer
30: Intermediate layer
40: Surface layer

The invention claimed is:

1. A part comprising a base material and a surface layer on the base material, wherein
a surface of the part has a concave and convex structure characterized by the following properties defined in JIS B 0681-2 (2018):
a root mean square height (Sq) of 0.03 μm or more to 1 μm or less,
a skewness (Ssk) of −1 or more to 5 or less, and
an autocorrelation length (Sal) of 10 μm or more to 65 μm or less; and
the surface layer is water-repellent, and exhibits a sputtering time of 5 minutes or less, the sputtering time being a time taken from the start of the sputtering to an end point of the surface layer, and the end point being defined, in a profile obtained by an XPS depth direction analysis of the surface layer, as a point where a difference of an absolute value between a carbon atom concentration at a certain measurement point and a carbon atom concentration at a measurement point just prior to the certain measurement point is 1.0 at % or less.

2. The part according to claim 1, wherein the concave and convex structure has the following properties:
the root mean square height (Sq) of 0.04 μm or more to 1 μm or less,
the skewness (Ssk) of −1 or more to 5 or less, and
the autocorrelation length (Sal) of 10 μm or more to 55 μm or less.

3. The part according to claim 1, wherein the surface layer has a sputtering time of 3 minutes or less, the sputtering time being a time taken from the start of the sputtering from an end point of the surface layer, and the end point being defined, in a profile obtained by an XPS depth direction analysis of the surface layer, as a point where an absolute value of a difference between a carbon atom concentration at a certain measurement point and a carbon atom concentration at a measurement point just prior to the certain measurement point is 1.0 at % or less.

4. The part according to claim 1, wherein the part is used as a faucet, or a part constituting a toilet, or a part constituting a bathroom.

5. The part according to claim 4, wherein the surface of the part is applied for a surface facing down or a back surface of the faucet, or the part constituting a toilet, or the part constituting a bathroom.

6. The part according to claim 2, wherein the surface layer has a sputtering time of 3 minutes or less, the sputtering time being a time taken from the start of the sputtering from an end point of the surface layer, and the end point being defined, in a profile obtained by an XPS depth direction analysis of the surface layer, as a point where an absolute value of a difference between a carbon atom concentration at a certain measurement point and a carbon atom concentration at a measurement point just prior to the certain measurement point is 1.0 at % or less.

7. The part according to claim 2, wherein the part is used as a faucet, or a part constituting a toilet, or a part constituting a bathroom.

8. The part according to claim 7, wherein the surface of the part is applied for a surface facing down or a back surface of the faucet, or the part constituting a toilet, or the part constituting a bathroom.

9. The part according to claim 3, wherein the part is used as a faucet, or a part constituting a toilet, or a part constituting a bathroom.

10. The part according to claim 9, wherein the surface of the part is applied for a surface facing down or a back surface of the faucet, or the part constituting a toilet, or the part constituting a bathroom.

11. The part according to claim 1, wherein the surface layer contains organic molecules.

12. The part according to claim 1, wherein the part further comprises an intermediate layer.

13. The part according to claim 2, wherein the surface layer contains organic molecules.

14. The part according to claim 2, wherein the part further comprises an intermediate layer.

15. The part according to claim 3, wherein the surface layer contains organic molecules.

16. The part according to claim 3, wherein the part further comprises an intermediate layer.

17. The part according to claim 4, wherein the surface layer contains organic molecules.

18. The part according to claim 4, wherein the part further comprises an intermediate layer.

19. A method for manufacturing the part according to claim 1, the method comprising:
(a) a step of providing a base material, a surface of which having a concave and convex structure characterized by the following properties defined in JIS B 0681-2 (2018):
a root mean square height (Sq) of 0.03 μm or more to 1 μm or less,
a skewness (Ssk) of −1 or more to 5 or less, and
an autocorrelation length (Sal) of 10 μm or more to 65 μm or less; and
(b) a step of forming a surface layer on the surface of the base material having the concave and convex structure.

20. The method according to claim 19, further comprising a step of plating the surface of the base material having the concave and convex structure between the step (a) and the step (b).

21. The method according to claim 19, wherein the step (a) comprises:
(a1) a step of providing a support member, and
(a2) a step of manufacturing the base material by forming a concave and convex structure on a surface of the support member, the concave and convex structure being characterized by the following properties defined in JIS B 0681-2 (2018):
a root mean square height (Sq) of 0.03 μm or more to 1 μm or less,
a skewness (Ssk) of −1 or more to 5 or less, and
an autocorrelation length (Sal) of 10 μm or more to 65 μm or less.

22. The method according to claim 20, further comprising a step of plating a surface of the support member to manufacture the support member including a plated layer on the surface thereof between the step (a1) and the step (a2).

23. A method for manufacturing the part according to claim 2, the method comprising:
(a) a step of providing a base material, a surface of which having a concave and convex structure characterized by the following properties defined in JIS B 0681-2 (2018):
a root mean square height (Sq) of 0.03 μm or more to 1 μm or less,
a skewness (Ssk) of −1 or more to 5 or less, and
an autocorrelation length (Sal) of 10 μm or more to 65 μm or less; and
(b) a step of forming a surface layer on the surface of the base material having the concave and convex structure.

24. The method according to claim 23, further comprising a step of plating the surface of the base material having the concave and convex structure between the step (a) and the step (b).

25. The method according to claim 24, wherein the step (a) comprises:
(a1) a step of providing a support member, and
(a2) a step of manufacturing the base material by forming a concave and convex structure on a surface of the support member, the concave and convex structure being characterized by the following properties defined in JIS B 0681-2 (2018):
a root mean square height (Sq) of 0.03 μm or more to 1 μm or less,
a skewness (Ssk) of −1 or more to 5 or less, and
an autocorrelation length (Sal) of 10 μm or more to 65 μm or less.

26. The method according to claim 25, further comprising a step of plating a surface of the support member to manufacture the support member including a plated layer on the surface thereof between the step (a1) and the step (a2).

* * * * *